United States Patent
Bessho (10) Patent No.: US 7,453,594 B2
(45) Date of Patent: Nov. 18, 2008

(54) DOCUMENT FILING APPARATUS FOR STORING INFORMATION ADDED TO A DOCUMENT FILE

(75) Inventor: Goroh Bessho, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 766 days.

(21) Appl. No.: 10/190,503

(22) Filed: Jul. 9, 2002

(65) Prior Publication Data

US 2003/0025940 A1 Feb. 6, 2003

(30) Foreign Application Priority Data

Jul. 11, 2001 (JP) .............................. 2001-210197
Jul. 4, 2002 (JP) .............................. 2002-195516

(51) Int. Cl.
*G06K 15/00* (2006.01)
*G06K 15/02* (2006.01)

(52) U.S. Cl. ..................................... 358/1.16; 358/1.13

(58) Field of Classification Search ................... 382/56, 382/164, 294; 358/135, 136, 22, 105
See application file for complete search history.

(56) References Cited

U.S. PATENT DOCUMENTS

| | | | | |
|---|---|---|---|---|
| 4,748,678 A | * | 5/1988 | Takeda et al. ................ | 382/306 |
| 4,985,930 A | * | 1/1991 | Takeda et al. ................ | 382/306 |
| 5,020,122 A | * | 5/1991 | Walsh et al. ................. | 382/236 |
| 5,128,748 A | | 7/1992 | Murakami et al. | |
| 5,548,663 A | * | 8/1996 | Sekine et al. ................ | 382/164 |
| 5,692,073 A | * | 11/1997 | Cass ........................... | 382/219 |
| 5,812,705 A | * | 9/1998 | Wang et al. .................. | 382/294 |
| 5,920,658 A | | 7/1999 | Yamagata et al. | |
| 6,888,962 B1 | * | 5/2005 | Sonoda et al. ............... | 382/165 |
| 2002/0094122 A1 | * | 7/2002 | Matsukubo et al. ......... | 382/165 |

FOREIGN PATENT DOCUMENTS

| | | |
|---|---|---|
| EP | 0 326 137 | 8/1989 |
| EP | 0 434 415 A2 | 6/1991 |
| EP | 0 458 978 A1 | 12/1991 |
| JP | 02-28771 | 1/1990 |
| JP | 02301873 | 12/1990 |
| JP | 03-185970 | 8/1991 |
| JP | 04-81979 | 3/1992 |
| JP | 8-6833 | 1/1996 |
| JP | 08-77333 | 3/1996 |
| JP | 08-255237 | 10/1996 |
| JP | 09-245173 | 9/1997 |

OTHER PUBLICATIONS

Romano, Frank J. Delmar's Dictionary of Digital Printing & Publishing. Delmar Publishers. 1997.*

* cited by examiner

*Primary Examiner*—Gabriel I. Garcia
(74) *Attorney, Agent, or Firm*—Dickstein Shapiro LLP (57) ABSTRACT

An image memory stores image data of a document file. A bit map developing part converts the document file into bit map image data. A difference information extraction part compares the bit map image data with the image data so as to extract difference information representing a difference between the bit map image data and the image data. The difference information is saved as a deference information file.

46 Claims, 10 Drawing Sheets

```
                  AGENDA
                              2001/03/27

1. Object      × × × × × ×
    2. Discussion  × × × × × ×
    3. Decision    × × × × × ×
                                           ~ P
```

FIG.4

```
                  AGENDA
                              2001/03/27

1. Object      × × × × × ×
    2. Discussion  × × × × × ×
    3. Decision    × × × × × ×

Comments:  × × ×       ~ P
                   Notes:  × × ×
```

DOCUMENT FILING APPARATUS FOR STORING INFORMATION ADDED TO A DOCUMENT FILE

BACKGROUND OF THE INVENTION

1. Field of the Invention

The present invention generally relates to document filing apparatuses and, more particularly, to a document filing apparatus storing a large amount of document files in the form of text files and image files.

2. Description of the Related Art

Conventionally, a document filing apparatus that can register and manage document files such as a text file created by applications, such as a word processor, and a text file obtained as an image read by an image scanner is known.

In a field related to such a document filing apparatus, Japanese Laid-Open Patent Application No.08-6833 discloses a technique to change management data stored in a plurality of recording media all at once when updating management data (text files) of the same type stored in the recording media.

However, the technique disclosed in Japanese Laid-Open Patent Application No.08-6833 is limited to a case in which updating is performed on document files of the same format. Accordingly, if there are image files created by an image scanner and text files created by a word-processor, etc, it is difficult to update the image files and the text files with onetime operation for all recording media.

Moreover, the document file created as image data by an image scanner has less reusability of data as compared to the text file created by an application such as a word-processor. Moreover, the document file created as image data has a large file size as compared to the text file.

There often is a case in which the document file created by an application such as a word-processor is printed on a recording sheet so as to distribute as a material, and a memo or comment is written on the printed recording sheet. In order to store the information regarding the added memo or comment, the entire image on the recording sheet is converted into electronic data (image file) and is registered to a document filing apparatus together with the original text file. Accordingly, the size of the files registered to the document filing apparatus becomes very large since an image file is much larger than a text file.

SUMMARY OF THE INVENTION

It is a general object of the present invention to provide an improved and useful document filing apparatus and method in which the above-mentioned problems are eliminated.

A more specific object of the present invention is to reduce a large amount of data to be stored in a document filing apparatus by storing only information that has been added to a document that has been printed according to a text file.

Another object of the present invention is to extract difference information after correcting an offset between positions of an image formed based on a text file and an image read from a printed matter formed by printing the image data.

A further object of the present invention is to previously correct an offset between positions of an image formed based on a text file and an image read from a printed matter formed by printing the image data even when a color image is added to the printed matter.

Another object of the present invention is to output an image created by an original text file together with the added image.

Another object of the present invention is to enable an extraction of image information added to a printed matter that has been printed based on a text file even when the image is a color image.

Yet another object of the present invention is to reduce an amount of data to be stored in a document filing apparatus when extracting and storing an image added to a printed matter that has been printed based on a text file.

In order to achieve the above-mentioned objects, there is provided according to one aspect of the present invention a document filing apparatus comprising: an image memory storing image data of a document file; a bit map developing part converting the document file into bit map image data; a difference information extraction part comparing the bit map image data with the image data so as to extract difference information representing a difference between the bit map image data and the image data; and a memory storing the extracted difference information in the form of a file.

According to the above-mentioned invention, an image added to the original document can be extracted as the difference information and saved as a difference information file. Thus, there is no need to save the image data containing the added image data, thereby reducing an amount of data to be stored in the document filing apparatus. That is, a compression rate of the MH compression can be effectively increased since the difference information file contains a very small part that is represented by black pixels and a most part of the difference information file corresponds to a white-pixel part.

The document filing apparatus may further comprise a bit map memory which stores the bit map image data. The document filing apparatus may further comprise a data compressor compressing the difference information. The document filing may further comprise an image reading part reading an image so as to generate image data, wherein the image memory stores the image data generated by the image reading part.

In the document filing apparatus, the difference information extraction part may include an exclusive OR operation part which performs an exclusive OR operation on a pixel basis with respect to the image data stored in the image memory and the bit map image data so as to extract the difference information.

Additionally, the document filing apparatus may further comprise: a rectangle extraction part extracting a same color pixel connection component as a rectangle from each of the image data and the bit map image data; a rectangle comparison part comparing the image data with the bit map image data so as to obtain offset information regarding positional offset between the image data and the bit map image data in accordance with similarity of the rectangles; and a registration part correcting one of the image data and the bit map image data so as to align an image represented by the bit map image data and an image represented by the image data.

Further, the document filing apparatus may further comprise a binarizing part binarizing the image data to be stored in the image memory. The document filing apparatus may further comprise an image composition part synthesizing an image represented by the image data with an image represented by the differential information stored in the memory.

The document filing apparatus may further comprise a color designating part designating a specific color in an image represented by the image data, and the difference information extraction part extracts pixels of the designated specific color so as to generate the difference information.

In the document filing apparatus, the difference information extraction part may acquire EGB values of the pixels of the designated specific color in 3-dimensional space so as to determine that a pixel has the specific color when a distance between RCG values of the pixel is within a predetermined distance on the 3-dimensional space.

In the document filing apparatus, the difference information memory may store RGB values of an image represented by the difference information and information regarding a binary image corresponding to an image represented by the difference information.

Additionally, there is provided according to another aspect of the present invention a document filing apparatus comprising: first memory means for storing image data of a document file; conversion means for converting the document file into bit map image data; difference information extraction means for comparing the bit map image data with the image data so as to extract difference information representing a difference between the bit map image data and the image data; and second memory means for storing the extracted difference information in the form of a file.

Additionally, there is provided according to another aspect of the present invention a document filing method comprising: a first storing step of storing image data of a document file; a step of converting the document file into bit map image data; a step of comparing the bit map image data with the image data so as to extract difference information representing a difference between the bit map image data and the image data; and a second storing step of storing the extracted difference information in the form of a file.

Further, there is provided according to another aspect of the present invention a computer readable medium storing program code for causing a computer to electronically file documents, comprising: program code means for storing image data of a document file; program code means for converting the document file into bit map image data; program code means for comparing the bit map image data with the image data so as to extract difference information representing a difference between the bit map image data and the image data; and program code means for storing the extracted difference information in the form of a file.

Other objects, features and advantages of the present invention will become more apparent from the following detailed description when read in conjunction with the accompanying drawings.

DETAILED DESCRIPTION OF THE PREFERRED EMBODIMENT

A description will now be given of a first embodiment of the present invention.

Figure 1:
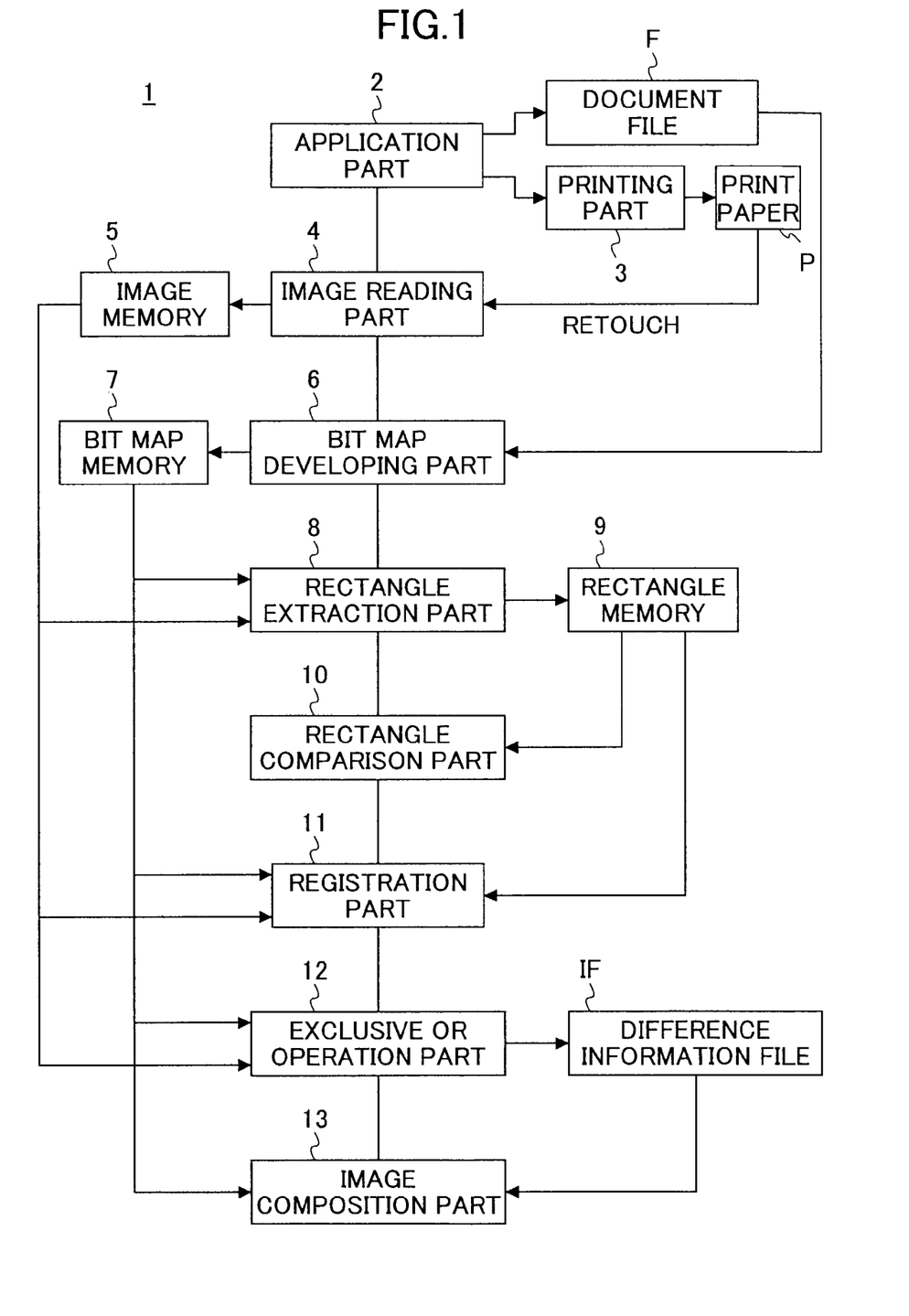
FIG. 1 is a functional block diagram of a document filing apparatus according to a first embodiment of the present invention.

FIG. 1 is a functional block diagram of a document filing apparatus 1 according to the first embodiment of the present invention. As shown in FIG. 1, the document filing apparatus 1 comprises an application part 2 such as a word processor which creates a document file F, a printing part 3 which prints the created document file on a print paper P, an image reading part which reads an image on the print paper P, and an image memory 5 which is a first memory for storing the read image data.

The document filing apparatus 1 further comprises a bit map developing part 6, a bit map memory 7, a rectangle extraction part 8, a rectangle memory 9, a rectangle comparison part 10, a registration part 11, an exclusive OR operation part 12 and an image composition part 13. The bit map developing part 6 is a conversion means, which develops the contents of the document file F into bit map data. The bit map memory 7 is a second memory used for the development of bit map. The rectangle extraction part 8 extracts a black pixel connection component as a rectangle for each of the read image data of a document image (touched-up document image), which includes an image added to the original document image, and the bit map image of the document file F. The rectangle memory 9 stores the extracted rectangle. The rectangle comparison part 10 compares the read image data of the touched-up document image with rectangles of the bit map image of the document file F so as to obtain offset information between the two images. The registration part 11 corrects the images so as to align the two images with each other. The exclusive OR operation part 12 extracts difference information by applying an exclusive OR operation on the two images. The image composition part 13 generates a synthetic image by superimposing an image of the difference information file IF on the bit map image of the document file F.

Figure 2:
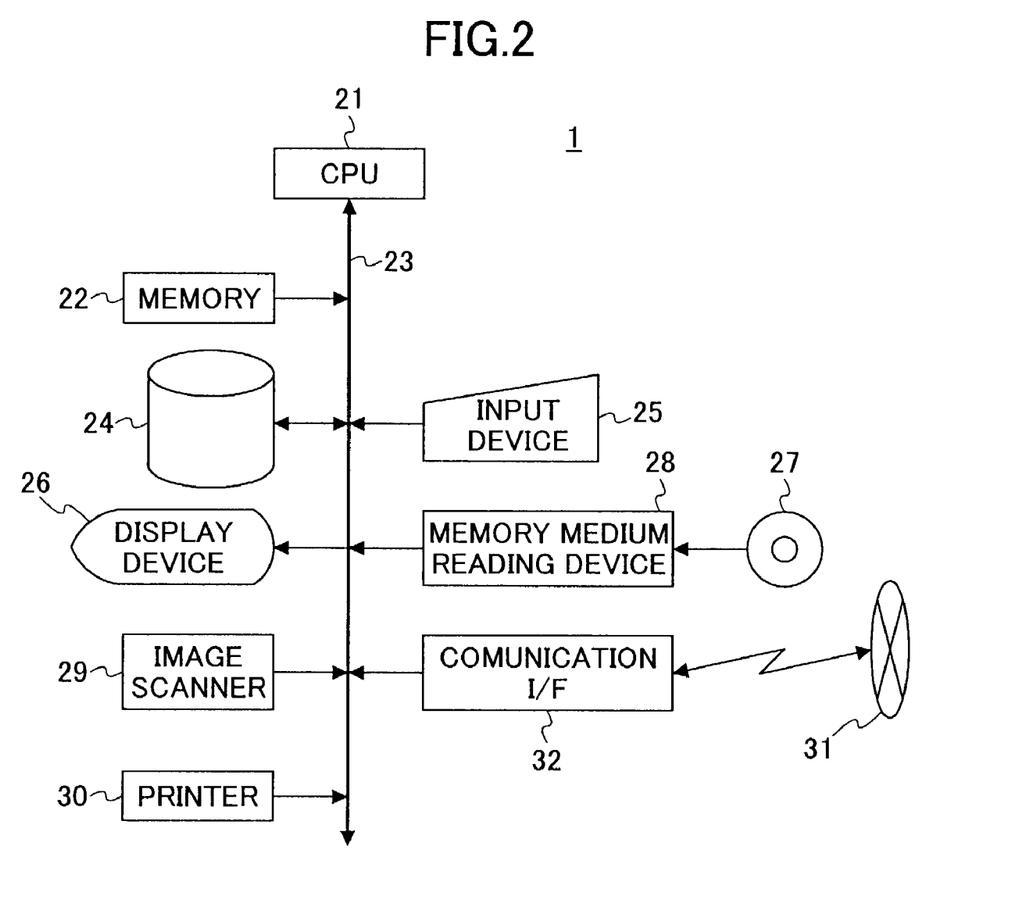
FIG. 2 is a block diagram of a hardware structure of the document filing apparatus shown in FIG. 1.

FIG. 2 is a block diagram of a hardware structure of the document filing apparatus 1. As shown in FIG. 2, the document filing apparatus 1 is constituted by a computer such as a personal computer (PC). The document filing apparatus 1 comprises a CPU 21, which performs various operations and controls each part of the document filing apparatus 1 intensively, and a memory 22, which is a storage device consisting of various kinds of ROMs and RAMs, and these parts are connected by a bus 23.

The bus 23 is connected with a magnetic storage device 24 such as a hard disk, an input device 25 constituted by a mouse, a keyboard, etc., a display device 26, a memory medium reading device 28 which reads a memory medium 27 such as an optical disc, an image scanner 29, and a printer 30 through predetermined interfaces. Moreover, a predetermined communication interface 32, which communicates with a network 31 such as the Internet, may be connected to the bus 23.

It should be noted that, as for the memory medium 27, various media can be used such as an optical disc such as a CD, DVD, etc., a magneto-optical disc, and a floppy. Moreover, as for the memory medium reading part 28, an optical disc apparatus, a magneto-optical disc apparatus or a floppy disc apparatus may be used in accordance with types of the storage medium 27.

The magnetic storage device 24 stores a document filing program which realizes the program according to the present invention. The magnetic storage 24 also stores application software such as a word processor. The document filing program is read from the memory medium 27 by the memory medium reading device 28 or is downloaded from a network 31 such as the Internet, and is installed in the magnetic storage device 24. The document filing apparatus 1 becomes operable by the installation of the document filing program. The document filing program may be a part of specific application software, such as the above-mentioned word processor. Moreover, the document filing program may operate on a predetermined operation system (OS).

The application part 2 is realized by a process based on application software such as a word processor. The document file F is a file that is created by the application software such as word processor software, spreadsheet software or presentation software.

The printing part 3 is realized by a printer 30. The image reading part 4 is realized by an image scanner 29. The predetermined memory domains of the memory 22 or the magnetic storage device 24 are assigned to the image memory 5, the bit map memory 7 and the rectangle memory 9 The bit map developing part 6, the rectangle extraction part 8, the rectangle comparison part 10, the registration part 11, the exclusive OR operation part 12, and the image composition part 13 are realized by processes based on the document filing program.

Next, a description will be given of an operation performed by the document filing apparatus 1.

Figure 3:
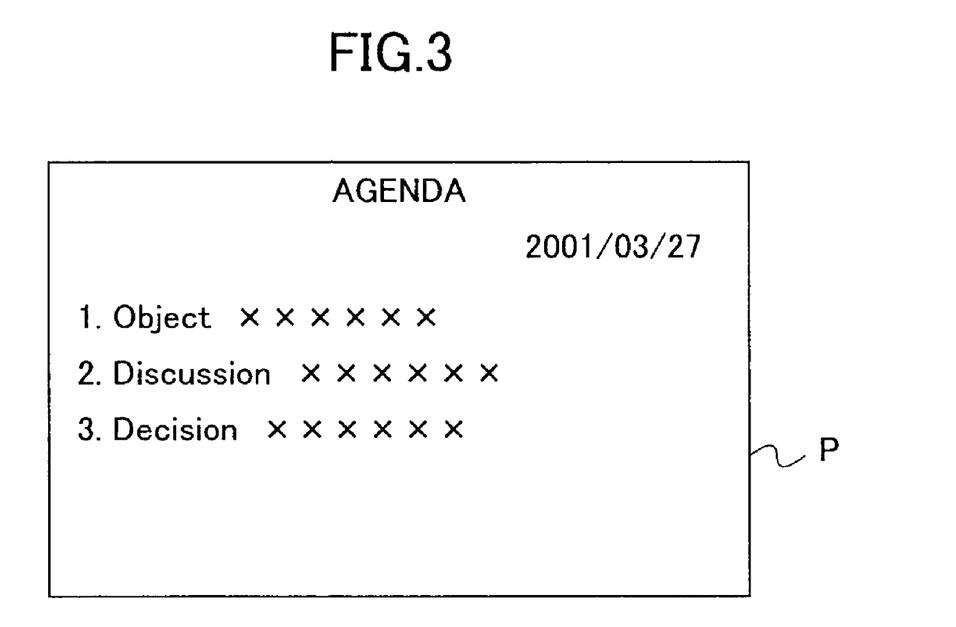
FIG. 3 is a plan view showing an example of an image printed on a print paper.
Figure 4:
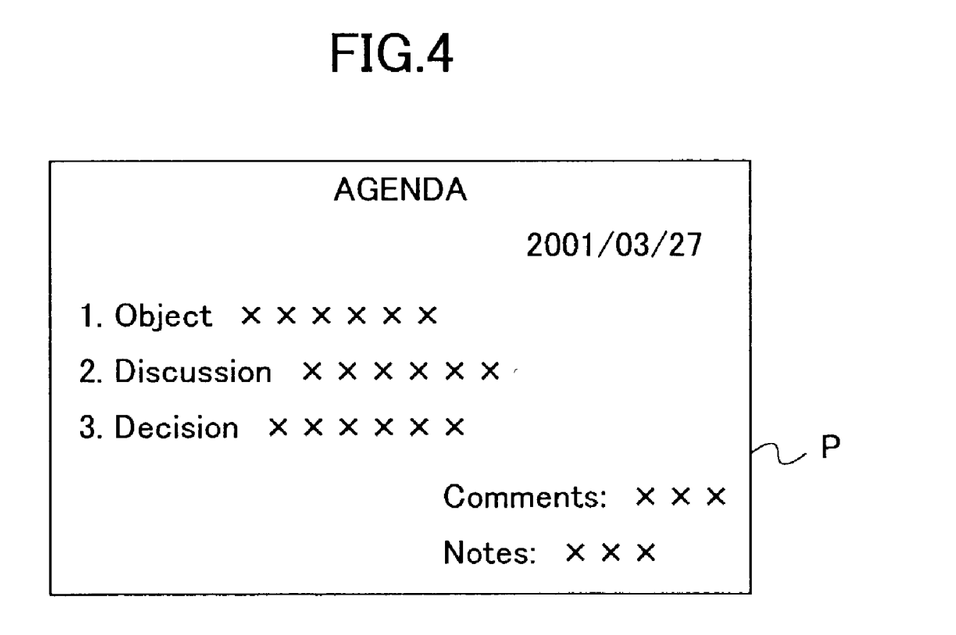
FIG. 4 is a plan view showing an example of the image on the print paper after an additional image such as a comment or a memorandum is added.

A user creates the document file (text file) F, which is a file to be processed by the document filing apparatus 1, by the application part using an application such as a word processor. Then, the user prints the created text file F on a print paper P by using the printing part 3. FIG. 3 is a plan view showing an example of the image printed on the print paper P. Then, the user writes or touches up a comment, a memorandum, etc. using a writing instrument on the print paper P. FIG. 4 is a plan view showing an example of the image on the print paper P after the additional image such as a comment or a memorandum is added.

Figure 7:
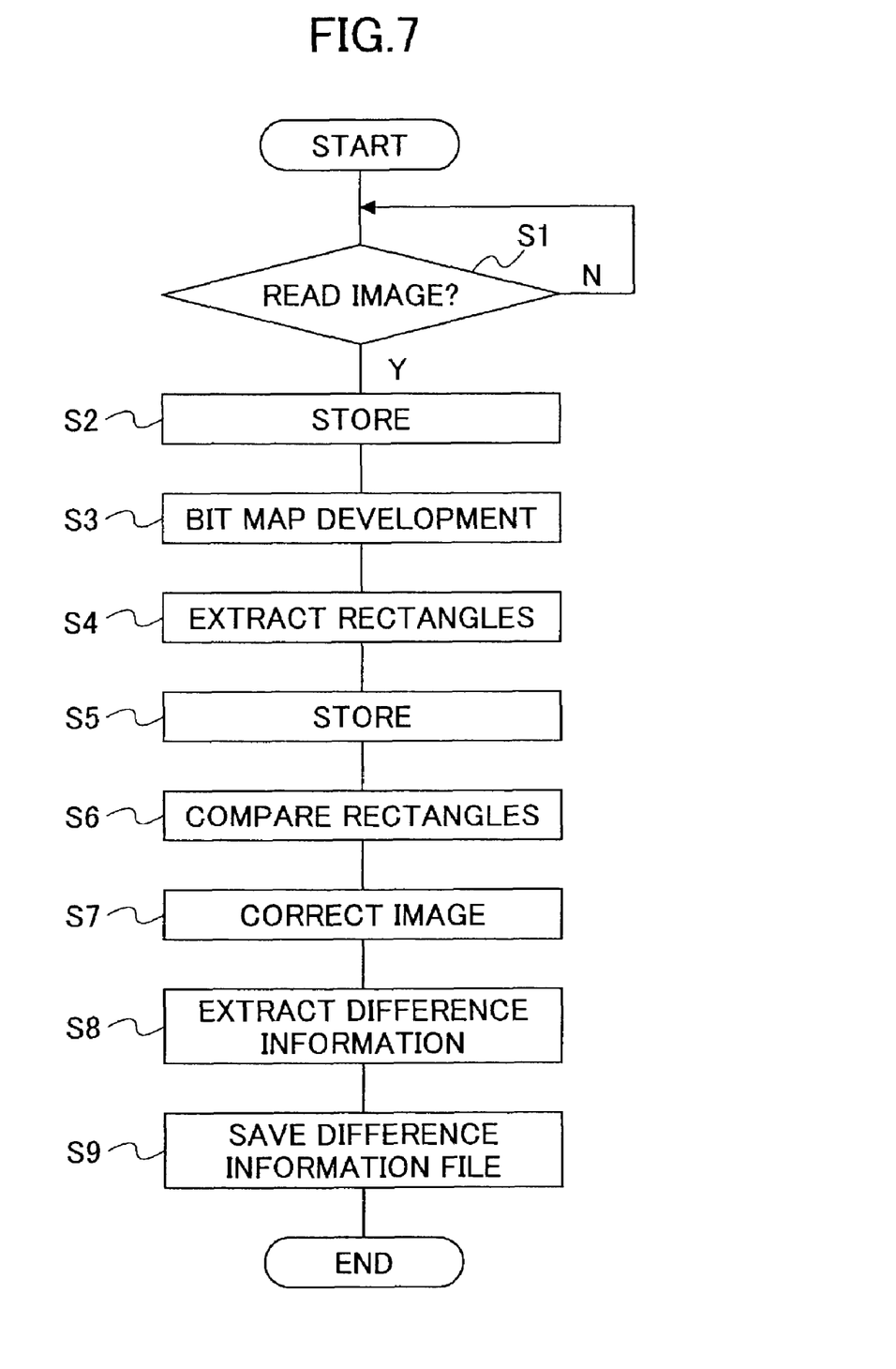
FIG. 7 is a flowchart of an operation performed by the document filing apparatus shown in FIG. 1.

Thereafter, the document filing apparatus 1 performs an operation shown in the flowchart of FIG. 7. That is, if the image on the touched up print paper P is read using the image scanner 29 (Y of step S1), the read image data is stored in the image memory 5 according to the document filing program (step S2). The process of Y of step S1 realizes an image reading step and an image reading process. The process of step S2 realizes a first storing step and a first storing process.

Next, the bit map developing part 6 develops the contents of the text file F created by the application part 2 to bit map data on the bit map memory 7 (step S3). The process of step S3 realizes a converting step, a conversion process, a third storing step, and a third storing process.

Figure 5:
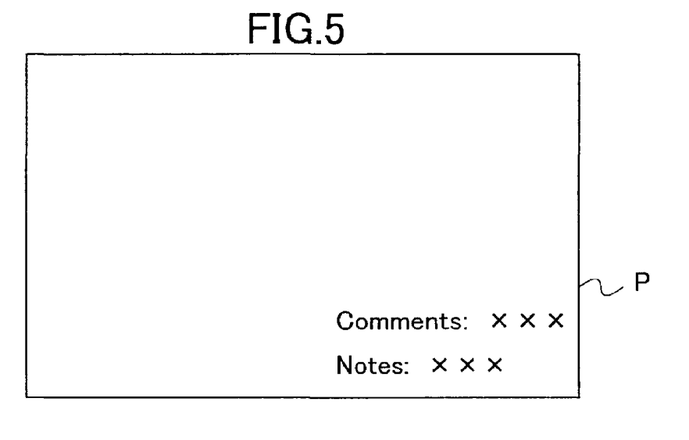
FIG. 5 is an illustration showing an example of the difference information between images shown in FIGS. 3 and 4.

Then, the exclusive OR operation part 12 compares the read image data of the touched up document image, which is stored in the image memory 5, with the bit map image of the text file F developed in the bit map data on the bit map memory 7 on a pixel basis so as to perform an exclusive OR operation and extract difference information (step S8). The thus-extracted difference information is saved as a difference information file IF (step S9). The process of step S8 realizes an information extraction step and a difference information extraction process. The process of step S9 realizes a second storing step and a second storing process. FIG. 5 is an illustration showing an example of the difference information between the read image data of a touched up document image and the bit map image of the text file F. FIG. 5 shows the extraction of the difference image, which includes the comments and notes added to the original document image.

Figure 6:
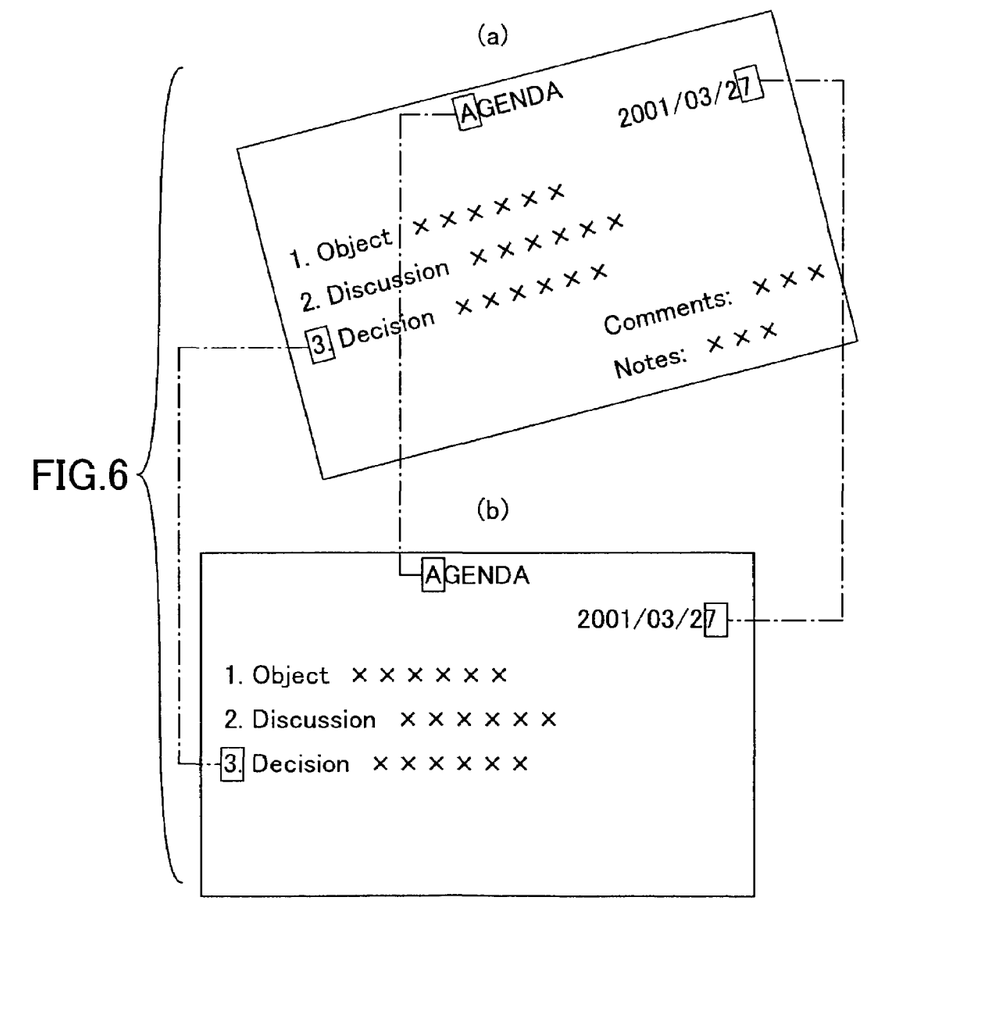
FIG. 6 is an illustration showing a case in which the read image shown in FIG. 4 inclines with respect to the original document image shown in FIG. 3.

In this case, it is rare that the image input from the print paper P completely matches the image of the electronic document developed into a bit map in their positions. For example, it is desirous to extract the difference information with respect to the bit map image of the text file F shown in FIG. 6-(*b*) even if the read image data of the touched up document image inclines as shown in FIG. 6-(*a*). Therefore, it is necessary to perform a registration (steps S4-S7) when extracting the difference information from the two images.

Namely, in order to perform the registration, first, the rectangle extraction part 8 extracts a black pixel connection component as a rectangle (step S4) with respect to each of the read image data of the touched up document image and the bit map image of the text file F, and stores the rectangle in the rectangle memory 9 (step S5). Then, the rectangle comparison part 10 compares the rectangle of the read image data of the document image with the rectangle of the bit map image of the text file F so as to obtain rectangles having features similar to each other, and obtain position offset information between the two images (step S6). Specifically, search is made for rectangles having sizes and positions close to each other. In order to search for corresponding rectangles, the exclusive OR operation is made with respect to black pixels and white pixels in the rectangle, and it can determined that the rectangles match each other when the resultant value of the exclusive OR operation is smaller than a predetermined value. Moreover, errors can be reduced is the rectangles are extracted from the whole image as uniformly as possible. Then, based on the offset information of the two images obtained in step S6, the registration part 11 corrects the image by obtaining a coefficient of affine transformation, for example, so as to align the two images with each other (step S7). The process of step S4 realizes a rectangle extraction step and a rectangle extraction process. The process of step S6 realizes a rectangle comparison step and a rectangle comparison process. The process of step S7 realizes a registration step and a registration process.

When saving the difference information as the difference information file IF, the read image data of the touched up document image is discarded (step S9) and the text file F and the obtained difference information file IF are registered. Accordingly, most part of the difference information file IF consists of a background pixel (usually white pixel). For this reason, if a compression method such as the MH method is adopted, for example, a very high compression efficiency is acquired.

When using a compression method such as the MH method, a higher compression rate can be obtained as a part represented by black pixels is small (a part represented by white pixels is large). Thus, compression of the difference information having a large white-pixel part provides a reduction in the file size. The compression of the difference information may be performed when saving the difference information file in a storing means such as a hard disk. Additionally, when combining the difference information and bit map data, the compressed difference information is decompressed when being developed on a memory. As mentioned above, the file size can be reduced by saving the original document file and the difference information file.

When reviewing the document re-registered by the process shown in FIG. 7 again in order to reuse the re-registered document by an application such as a word processor, the text file F is merely read.

Figure 8:
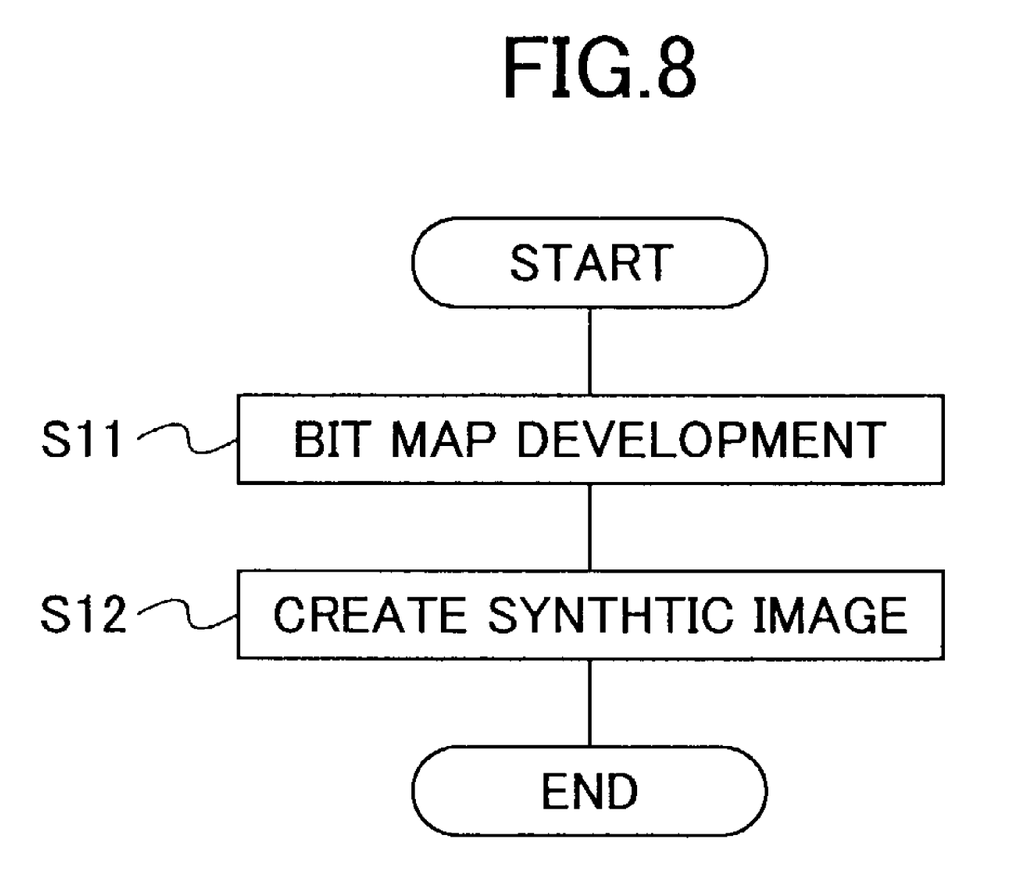
FIG. 8 is a flowchart of an operation performed when it is desired to refer to an image added to an original document image.

On the other hand, when it is desired to refer to the contents of the touched up document image, the process shown in FIG. 8 is performed. That is, as shown in FIG. 8, the bit map developing part 6 develops the text file F to a bit map again on the bit map memory 7 (step S11). Then, the image composition part 13 forms a synthetic image by superimposing the bit map image with the image of the information file IF (step S12). The process of step S12 realizes an image composition step and an image composition process. Accordingly, an image having the contents of the touch up to the image of the text file F can be acquired.

If two files are given the same file name with different extensions such that the image data obtained by reading by a scanner is given a file name "0001.scn" and an original document file is given a file name "0001.org", these files can be related to each other. Then, if difference information is extracted from the above two files and the difference information file is given a file name "0001.dif", the three files can be related to each other.

Figure 9A:
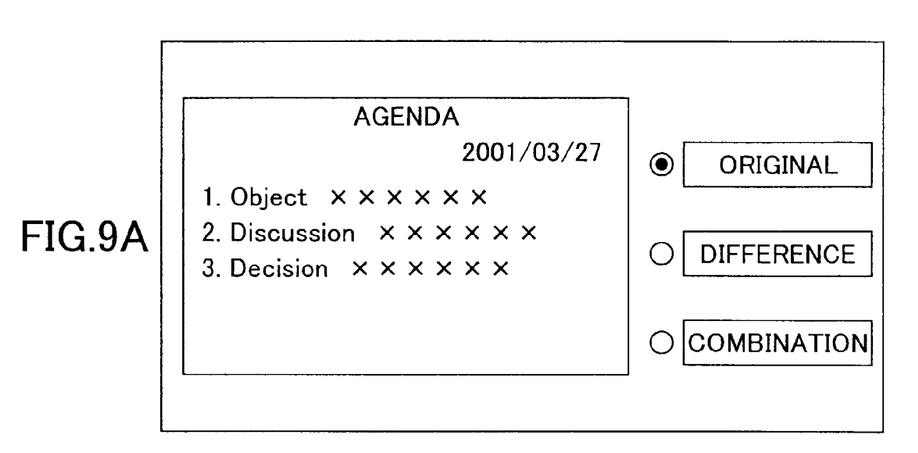
FIGS. 9A, 9B and 9C are illustrations showing display screens provided with file selection buttons.
Figure 9B:
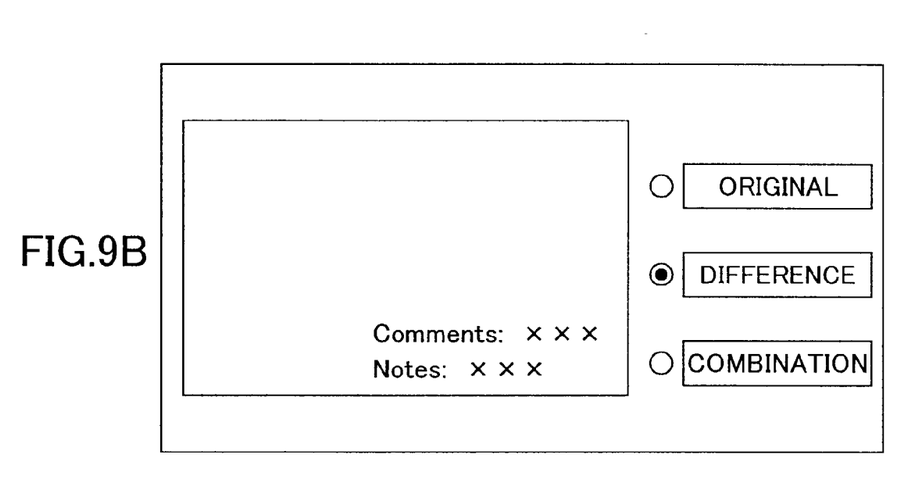
Figure 9C:
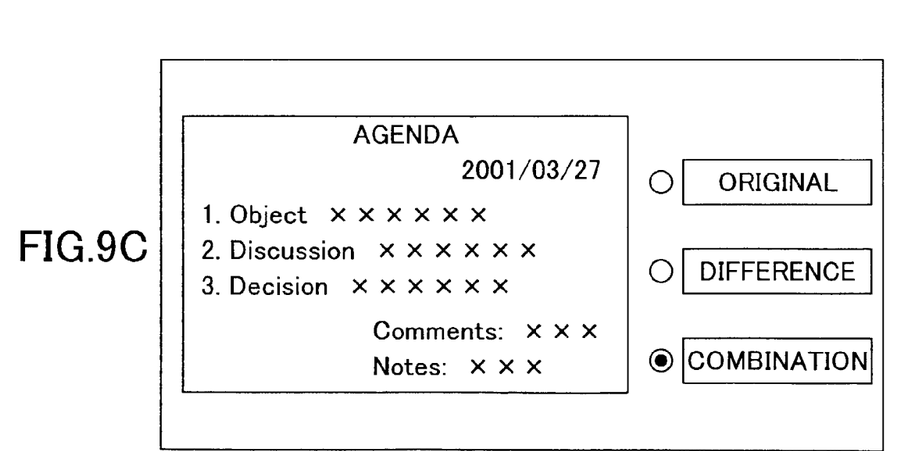

Additionally, as shown in FIGS. 9A, 9B and 9C, buttons indicating the kinds of files to be displayed may be provided in the file display screen so that a user can select one of the files (original, difference, combination) by pressing (clicking) one of the buttons so as to display a desired one of the original document file, the difference information file and the combination of the original file and the difference information file.

A description will now be given of a second embodiment of the present invention.

Figure 10:
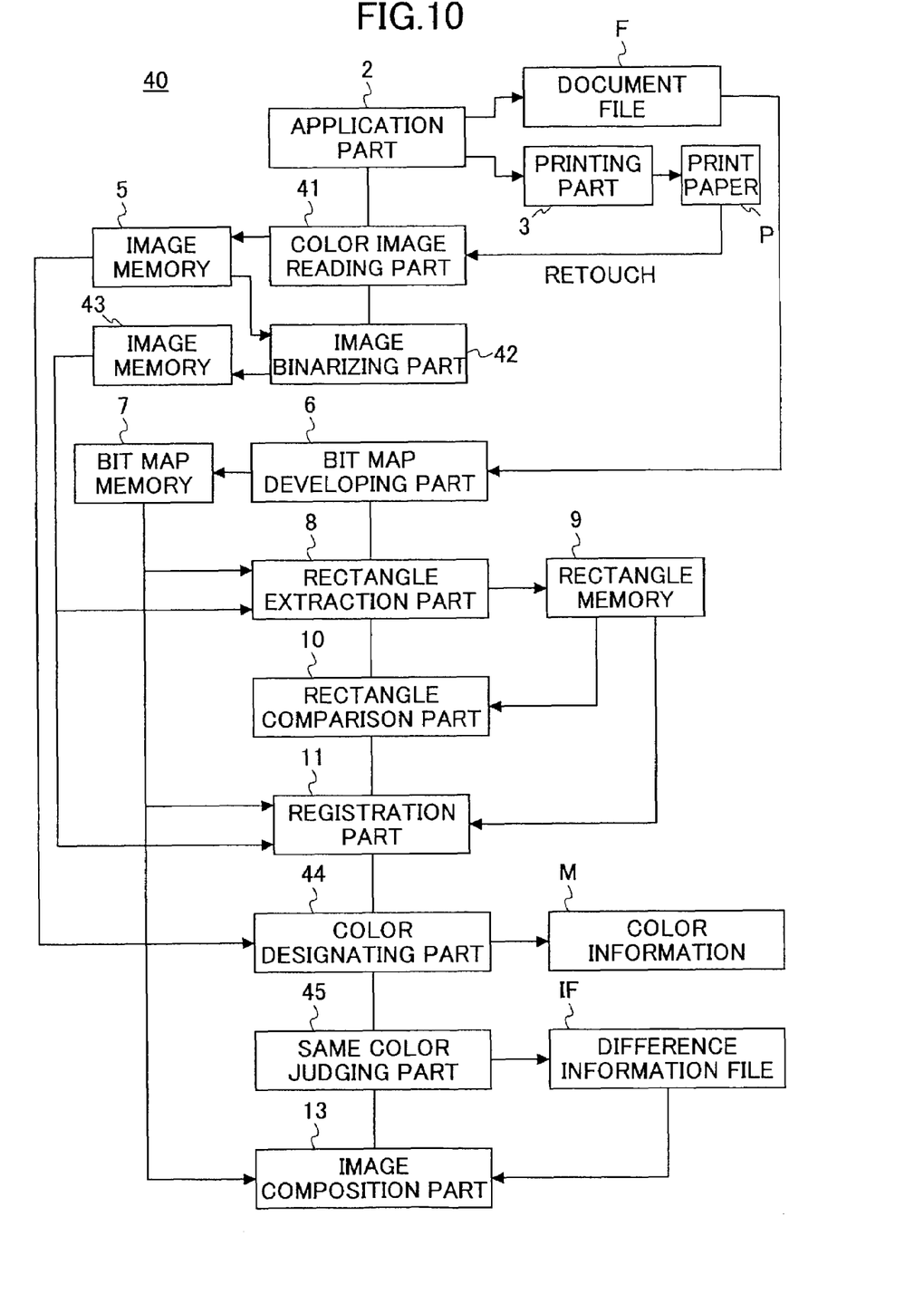
FIG. 10 is a functional block diagram of a document filing apparatus according to a second embodiment of the present invention.

FIG. 10 is a functional block diagram of a document filing apparatus 40 according to the second embodiment of the present invention. In FIG. 10, parts that are the same as the parts shown in FIG. 1 are given the same reference numerals, and descriptions thereof will be omitted.

The document filing apparatuses 40 comprises a color image reading part 41 as an image reading means, an image binarizing part 42, an image memory 43 which is a first storage device, a color designating part 44, and a same color judging part 45 which is information extraction means.

The hardware structure of the document filing apparatus 40 is the same as that of the document filing apparatus 1 shown in FIG. 2. That is, the color image reading part 41 is realized by the image scanner 29, which can read a color image. An image memory 43 is provided to the memory 22 or the magnetic storage device 24. The image binarizing part 42, the color designating part 44 and the same color judging part 45 are realized by the process performed according to the document filing program.

Next, a description will be given of an operation performed by the document filing apparatus 40.

First, similar to the first embodiment, a document file (text file) F, which is a file to be registered to the document filing apparatus 40, is created by the application part 2. The created text file F is printed on the printing paper P using the printing part 3. Then, a user adds or touches up a comment, a memorandum, etc. using a writing instrument to the printing paper P.

By the way, there often is a case in which the additional comment or memorandum is written in color other than black on the printing paper which has been printed in monochrome by using, for example, a red pen, other than a black writing instrument. Then, the document filing apparatus 40 carries out extraction and recognition of the retouch by color other than black by performing the process shown in the flowchart of FIG. 11.

Figure 11:
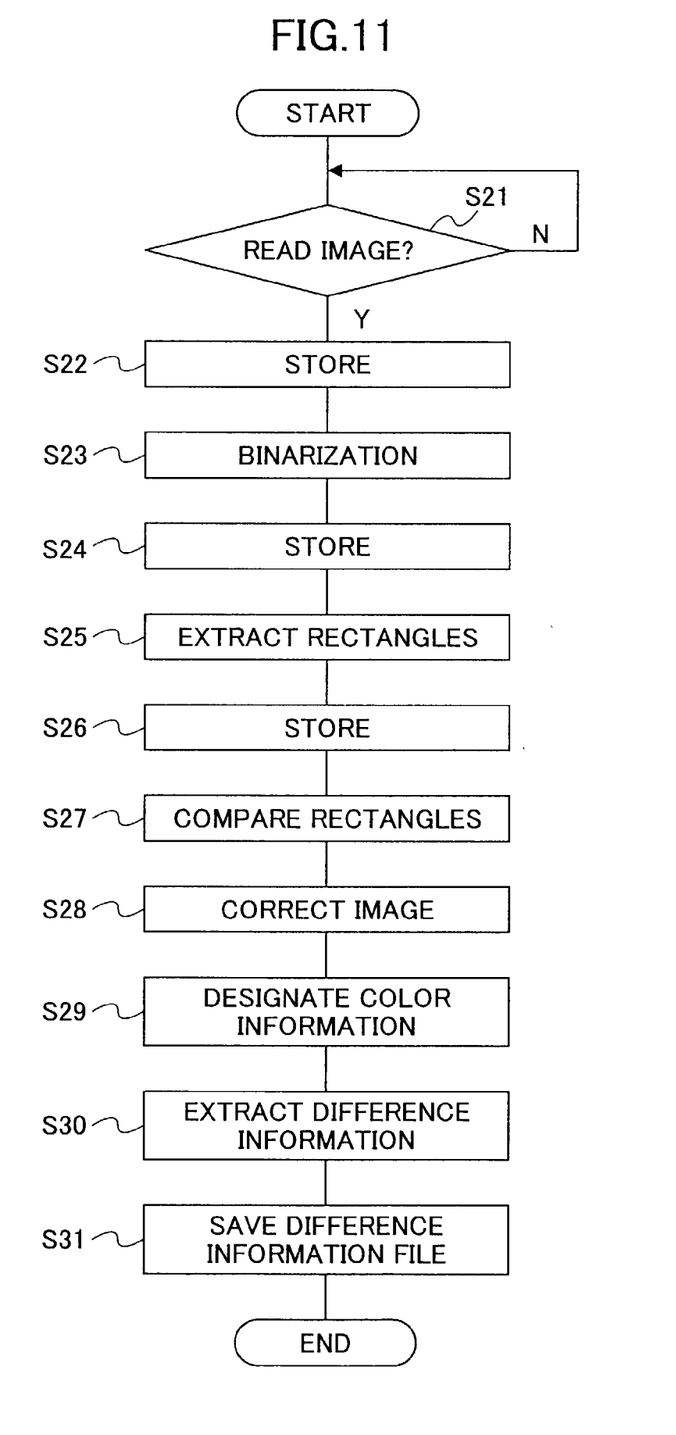
FIG. 11 is a flowchart of an operation performed by the document filing apparatus shown in FIG. 9.

That is, in case the document filing apparatus 40 reads the retouched document image, the document image is read as a color image using the color image reading part 41 which can read a color image. When the image of the retouched printing paper P is read using the image scanner 29 (Y of step S21), the read image data is stored in the image memory 5 according to a document filing program (step S22). The process of Y of step S21 realizes an image reading step and an image reading process. Additionally, the process of step S22 realizes a first storing step and a first storing process.

Then, a user designates the color of the image to be extracted as difference information through the color designating part 44 (step S29). Specifically, the read image data in the image memory 5 is displayed on the display device 26, and the pixel of the added image is designated by pointing by the input device 25 such as a pointing device like a mouse. Thereby, information regarding the color of the image to be extracted as the difference information can be input. The information regarding the designated color is saved as color information M. The process of step S29 realizes a color designating step and a color designating process.

Next, the same color judging part 45 acquires a value of the pixel having the designated color in the 3-dimensional space of RGB in accordance with the color information M. For example, if the distance on the 3-dimensional space is within a predetermined range, it is regarded as the same color. Accordingly, all images having the same color pixel are determined as the added images, and all pixels of other color are deleted from the image (step S30). The thus-obtained image information is saved as the difference information file IF (step S31). The process of step S30 realizes a difference information extraction step and a difference information extraction process. Moreover, the process of step S31 realizes a second storing step and a second storing process.

Figure 12:
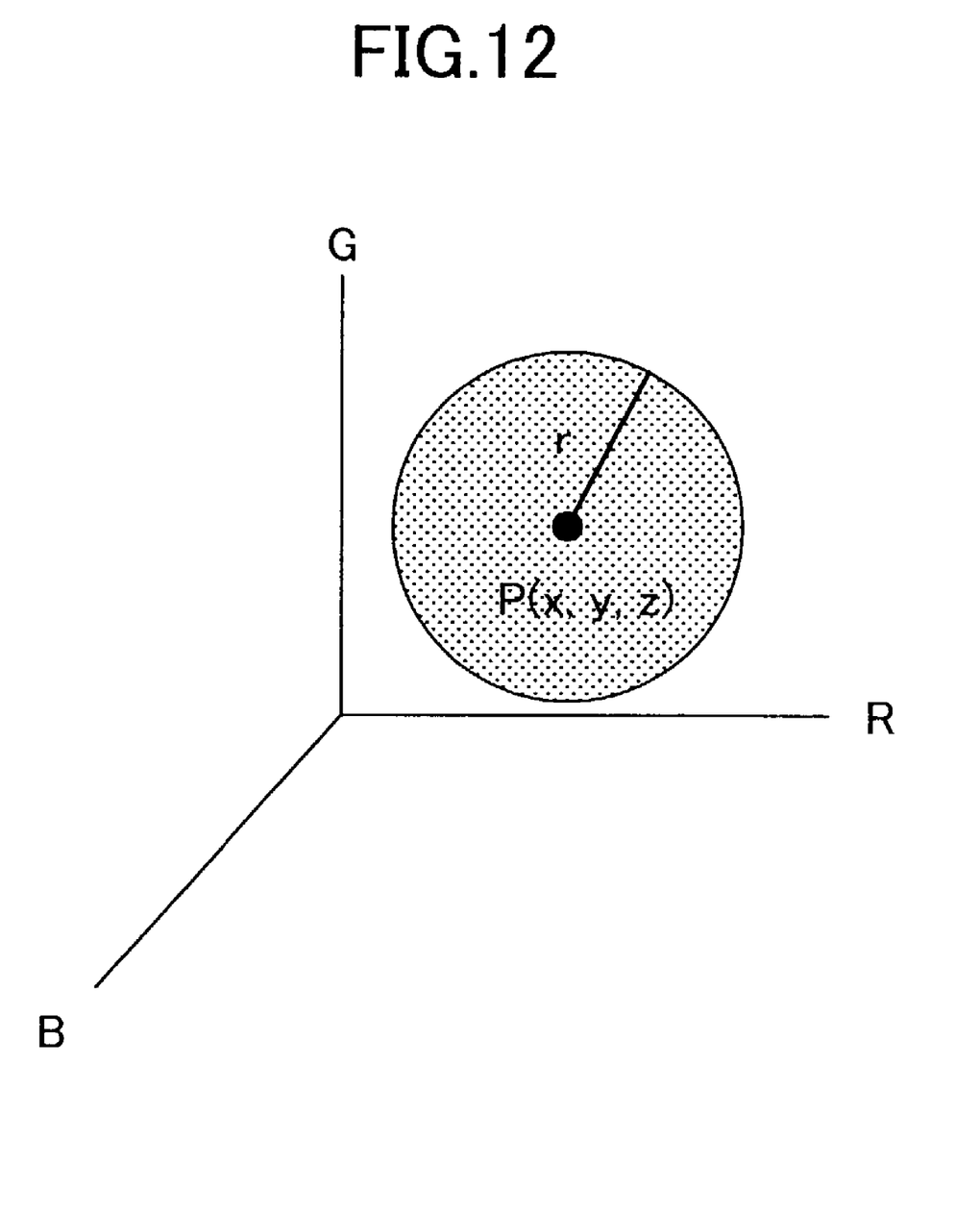
FIG. 12 is an illustration showing an RGB three-dimensional space of color pixels.

When a color corresponding to a point P as shown in FIG. 12, a sphere having a radius r is assumed, and points contained in the sphere can be determined as the same color. The radius r may be previously determined or may be arbitrarily set by a user. If a large length is set to the radius r, the same color range is enlarged.

It should be noted that when saving the difference information file IF with respect to a color image, the file size becomes huge if all 3-dimensional RGB data is saved. For this reason, the RGB values of the designated pixel and an image of the difference pixel in black are created so as to reduce an amount of data of the difference information file IF.

By the way, a positional offset of the image may also occur when the image is a color image. A description will be given below of an operation of correcting such a positional offset. First, the image binarizing part 42 binarizes the color image of the image memory 5 so as to change the color image into a monochrome binary image (step S23). The binarized image data is stored in the image memory 43 (step S24). The process of step S23 realizes a binarizing step and a binarizing process.

Then, a process for registration is applied to the binarized image and the bit map image of the text file F (steps S25-S28) in the same manner as the process of steps S4 through S7. That is, the rectangle extraction part 8 extracts a black pixel connection component as a rectangle (step S25), and stores it in the rectangle memory 9 (step S26). The rectangle comparison part 10 compares the rectangles with each other so as to acquire rectangles having similar characteristics, and acquires positional offset information (step S27). The registration part 11 corrects the image based on the positional offset information so as to perform registration of the two images (step S28). The process of step S25 realizes a rectangle extraction step and a rectangle extraction process. The process of step S27 realizes a rectangle comparison step and a rectangle comparison process. Additionally, the process of step S28 realizes a registration step and a registration process. It should be noted that, similar to the above-mentioned first embodiment, when it is desired to refer to the contents of the touched up document image, the bit map developing part 6 develops the text file F to a bit map again on the bit map memory 7. Then, the image composition part 13 forms a synthetic image by superimposing the bit map image with the image of the information file IF.

The present invention is not limited to the specifically disclosed embodiments, and variations and modifications may be made without departing the scope of the present invention.

The present application is based on Japanese priority applications No. 2001-210197 filed Jul. 11, 2001 and No. 2002-195516 filed Jul. 4, 2002, the entire contents of which are hereby incorporated be reference.

What is claimed is:

1. A document filing apparatus comprising:
    an image memory storing image data of a document produced by reading the document by a scanner;
    a bit map developing part converting a text file describing the document into first bit map image data;
    a difference information extraction part comparing the first bit map image data with the image data so as to extract difference information representing a difference between the first bit map image data and the image data; and
    a memory storing the extracted difference information in the form of a file; and wherein said document filing apparatus is arranged such that, subsequent to said comparing, said bit map developing part converts said text file into second bit map image data.

2. The document filing apparatus as claimed in claim 1, further comprising a bit map memory which stores the first bit map image data.

3. The document filing apparatus as claimed in claim 1, further comprising a data compressor compressing the difference information.

4. The document filing apparatus as claimed in claim 1, further comprising an image reading part reading an image so as to generate image data, wherein said image memory stores the image data generated by the image reading part.

5. The document filing apparatus as claimed in claim 1, wherein the difference information extraction part includes an exclusive OR operation part which performs an exclusive OR operation on a pixel basis with respect to said image data stored in the image memory and said first bit map image data so as to extract said difference information.

6. The document filing apparatus as claimed in claim 1, further comprising:
    a rectangle extraction part extracting a same color pixel connection component as a rectangle from each of said image data and said first bit map image data;
    a rectangle comparison part comparing said image data with said first bit map image data so as to obtain offset information regarding positional offset between said image data and said first bit map image data in accordance with similarity of the rectangles; and
    a registration part correcting one of said image data and said first bit map image data so as to align an image represented by said first bit map image data and an image represented by said image data.

7. The document filing apparatus as claimed in claim 6, further comprising a binarizing part binarizing said image data to be stored in said image memory.

8. The document filing apparatus as claimed in claim 1, further comprising an image composition part synthesizing an image represented by said image data with an image represented by said differential information stored in said memory.

9. The document filing apparatus as claimed in claim 1, further comprising a color designating part designating a specific color in an image represented by said image data, and said difference information extraction part extracts pixels of the designated specific color so as to generate the difference information.

10. The document filing apparatus as claimed in claim 9, wherein said difference information extraction part acquires RGB values of the pixels of the designated specific color in 3-dimensional space so as to determine that a pixel has the specific color when a distance between RGB values of the pixel is within a predetermined distance on the 3-dimensional space.

11. The document filing apparatus as claimed in claim 9, wherein said difference information memory stores RGB values of an image represented by the difference information and information regarding a binary image corresponding to an image represented by the difference information.

12. A document filing apparatus comprising:
    first memory means for storing image data of a document produced by reading the document by a scanner;
    conversion means for converting a text file describing the document into first bit map image data;
    difference information extraction means for comparing the first bit map image data with the image data so as to extract difference information representing a difference between the first bit map image data and the image data; and
    second memory means for storing the extracted difference information in the form of a file; and
    wherein said document filing apparatus is arranged such that, subsequent to said comparing, said conversion means converts said text file into second bit map image data.

13. The document filing apparatus as claimed in claim 12, further comprising third memory means for storing the first bit map image data.

14. The document filing apparatus as claimed in claim 12, further comprising compression means for compressing the difference information.

15. The document filing apparatus as claimed in claim 12, further comprising image reading means for reading an image so as to generate image data, wherein the first memory stores the image data generated by the image reading means.

16. The document filing apparatus as claimed in claim 12, wherein said conversion means develops the document file in bit map data, and said difference information extraction means includes exclusive OR operation means for performing an exclusive OR operation on a pixel basis with respect to said image data stored in the first memory and said first bit map image data so as to extract said difference information.

17. The document filing apparatus as claimed in claim 12, further comprising:
    rectangle extraction means for extracting a same color pixel connection component as a rectangle from each of said image data and said first bit map image data;
    rectangle comparison means for comparing said image data with said first bit map image data so as to obtain offset information regarding positional offset between said image data and said first bit map image data in accordance with similarity of the rectangles; and registration means for correcting one of said image data and said first bit map image data so as to align an image represented by said first bit map image data and an image represented by said image data.

18. The document filing apparatus as claimed in claim 17, further comprising binarizing means for binarizing said image data to be stored in said first memory means.

19. The document filing apparatus as claimed in claim 12, further comprising image composition means for synthesizing an image represented by said image data with an image represented by said difference information stored in said second memory means.

20. The document filing apparatus as claimed in claim 12, further comprising color designating means for designating a specific color in an image represented by said first memory means, and said difference information extraction means extracts pixels of the designated specific color so as to generate the difference information.

21. The document filing apparatus as claimed in claim 20, wherein said difference information extraction means acquires RGB values of the pixels of the designated specific color in 3-dimensional space so as to determine that a pixel has the specific color when a distance between RGB values of the pixel is within a predetermined distance on the 3-dimensional space.

22. The document filing apparatus as claimed in claim 20, wherein said second memory means stores RGB values of an image represented by the difference information and information regarding a binary image corresponding to an image represented by the difference information.

23. A document filing method comprising:

storing image data of a document produced by reading the document by a scanner;

converting a text file describing the document into first bit map image data;

comparing the first bit map image data with the image data so as to extract difference information representing a difference between the first bit map image data and the image data; and storing the extracted difference information in the form of afile; and subsequent to said comparing, converting said text file into second bit map image data.

24. The document filing method as claimed in claim 23, further comprising a third step of storing the first bit map image data.

25. The document filing method as claimed in claim 23, further comprising a compressing step of compressing the difference information.

26. The document filing method as claimed in claim 23, further comprising a step of reading an image so as to generate the image data.

27. The document filing method as claimed in claim 23, further comprising developing the text file in bit map data, and said step of comparing includes a step of performing an exclusive OR operation on a pixel basis with respect to said image data and said first bit-map image data so as to extract said difference information.

28. The document filing method as claimed in claim 23, further comprising:

a step of extracting a same color pixel connection component as a rectangle from each of said image data and said first bit map image data;

a step of comparing said image data with said first bit map image data so as to obtain offset information regarding positional offset between said image data and said first bit map image data in accordance with similarity of the rectangles; and a step of correcting one of said image data and said first bit map image data so as to align an image represented by said first bit map image data and an image represented by said image data.

29. The document filing method as claimed in claim 28, further comprising a step of binarizing said image data to be stored.

30. The document filing method as claimed in claim 23, further comprising a step of synthesizing an image represented by said image data with an image represented by said difference information.

31. The document filing method as claimed in claim 23, further comprising a step of designating a specific color in an image represented by first memory means, and said step of comparing extracts pixels of the designated specific color so as to generate the difference information.

32. The document filing method as claimed in claim 31, wherein said step of comparing acquires RGB values of the pixels of the designated specific color in 3-dimensional space so as to determine that a pixel has the specific color when a distance between RGB values of the pixel is within a predetermined distance on the 3-dimensional space.

33. The document filing method as claimed in claim 31, wherein said second storing step stores RGB values of an image represented by the difference information and information regarding a binary image corresponding to an image represented by the difference information.

34. The document filing method of claim 23, further comprising discarding said image data produced by reading the document by a scanner.

35. The document filing method of claim 34, wherein said discarding is performed subsequent to said comparing.

36. A computer readable medium storing program code for causing a computer to electronically file documents, comprising:

program code means for storing image data of a document produced by reading the document by a scanner;

program code means for converting a text file describing the document into first bit map image data;

program code means for comparing the bit map image data with the image data so as to extract difference information representing a difference between the first bit map image data and the image data; and program code means for storing the extracted difference information in the form of a file; and wherein said program code causes said computer, subsequent to said comparing, to convert said text file into second bit map image data.

37. The computer readable medium as claimed in claim 36, further comprising program code means for storing the first bit map image data.

38. The computer readable medium as claimed in claim 36, further comprising program code means for compressing the difference information.

39. The computer readable medium as claimed in claim 36, further comprising program code means for reading an image so as to generate the image data.

40. The computer readable medium as claimed in claim 36, wherein said program code means for converting includes program code means for developing the text file in bit map data, and said program code means for comparing includes program code means for performing an exclusive OR operation on pixel basis with respect to said image data and said first bit map image data so as to extract said difference information.

41. The computer readable medium as claimed in claim 36, further comprising:
  program code means for extracting a same color pixel connection component as a rectangle from each of said image data and said first bit map image data;
  program code means for comparing said image data with said first bit map image data so as to obtain offset information regarding positional offset between said image data and said first bit map image data in accordance with similarity of the rectangles; and
  program code means for correcting one of said image data and said first bit map image data so as to align an image represented by said first bit map image data and an image represented by said image data.

42. The computer readable medium as claimed in claim 41, further comprising program code means for binarizing said image data to be stored.

43. The computer readable medium as claimed in claim 36, further comprising program code means for synthesizing an image represented by said image data with an image represented by said difference information stored.

44. The computer readable medium as claimed in claim 36, further comprising a step of designating a specific color in an image represented by said memory means, and said step of comparing extracts pixels of the designated specific color so as to generate the difference information.

45. The computer readable medium as claimed in claim 44, wherein said program code means for comparing acquires RGB values of the pixels of the designated specific color in 3-dimensional space so as to determine that a pixel has the specific color when a distance between RGB values of the pixel is within a predetermined distance on the 3-dimensional space.

46. The computer readable medium as claimed in claim 44, wherein said second storing program code means stores RGB values of an image represented by the difference information and information regarding a binary image corresponding to an image represented by the difference information.

* * * * *